Fig. 4
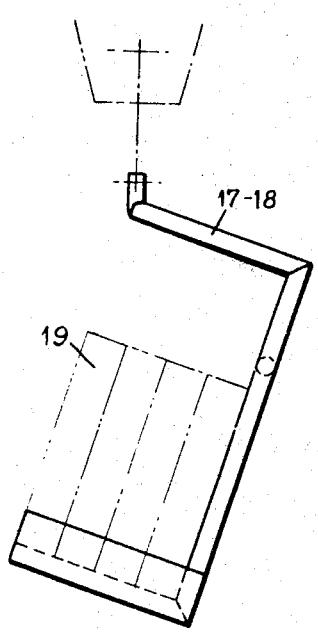
Fig. 5
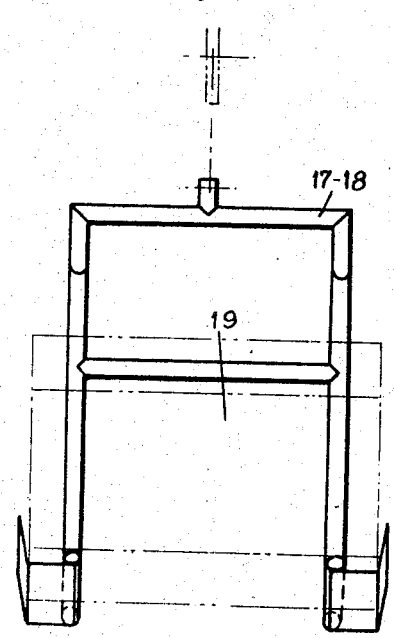
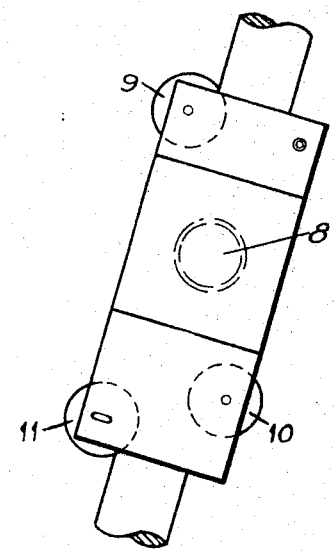
Fig. 6

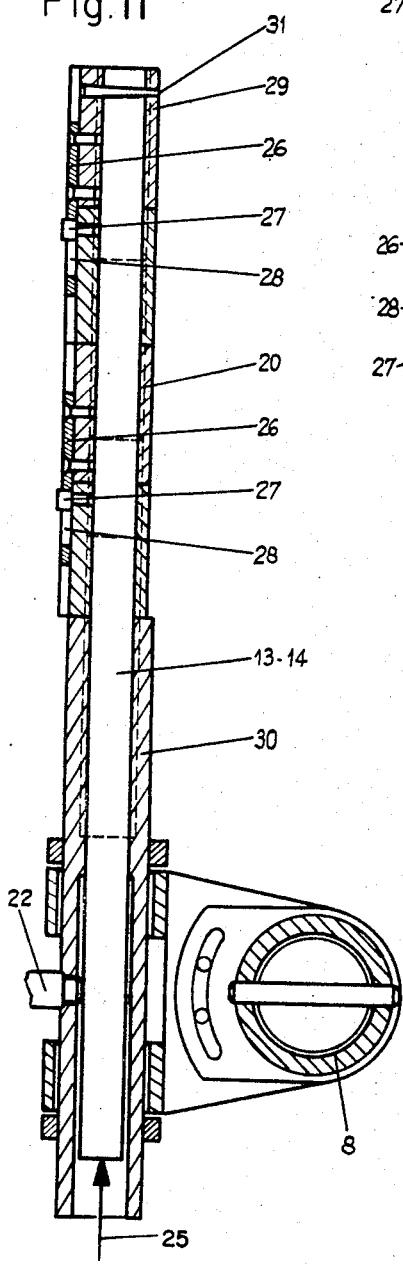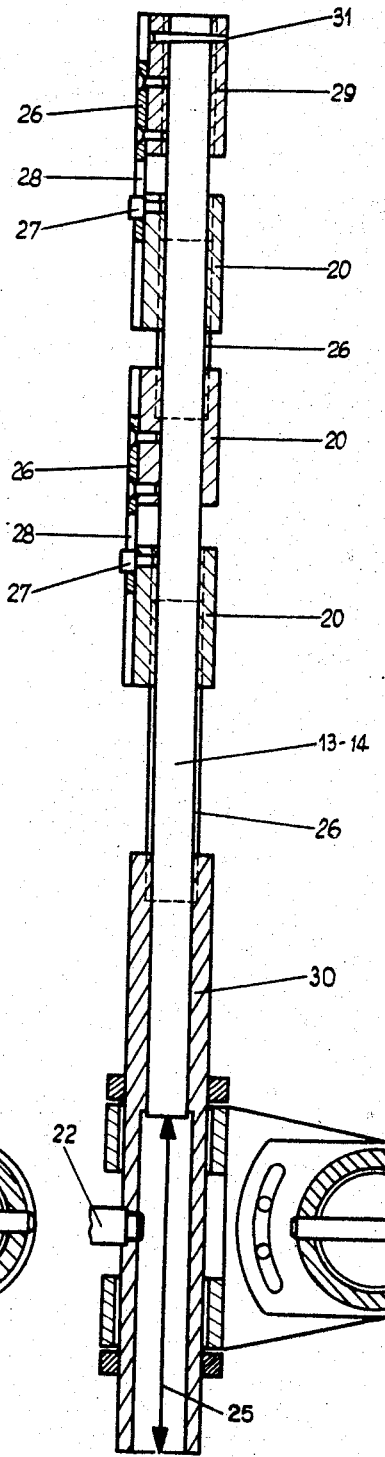

Fig. 13
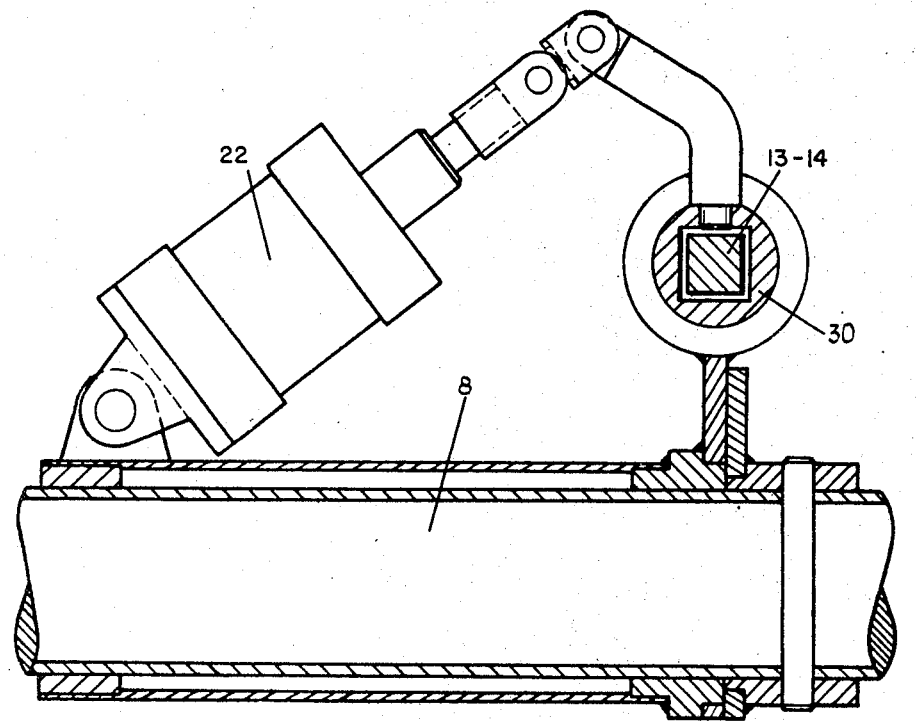
Fig. 14

United States Patent Office 3,450,287
Patented June 17, 1969

3,450,287
TRANSFERRING ARTICLES TO OR FROM CONVEYORS
Gerard Dubus, Combes-La-Ville, France, assignor to Service d'Exploitation Industrielle des Tabacs et des Allumettes, Paris, France, a French public establishment
Filed Aug. 4, 1966, Ser. No. 570,321
Claims priority, application France, Aug. 6, 1965, 27,461
Int. Cl. B66f 9/06; B68j 1/12
U.S. Cl. 214—622                                4 Claims

ABSTRACT OF THE DISCLOSURE

A device for transferring a plurality of bins containing products from a first conveyor to a second one which is located at a different level and which is independent from the first one. Mechanism by which full bins of products are unloaded from the first conveyor and transferred to the second conveyor while by the same movement of the mechanism empty bins are transferred from the second conveyor back to the first conveyor and are loaded thereon.

---

The present invention relates to a device for transferring articles to or from conveyors. More particularly it relates to a device, enabling the automatic transfer from one conveyor to another conveyor located in a different plane from the first and unattached to it, one or more bins of products.

It is known to bring products for packaging to the vicinity of the packaging machine with the aid of sling ("balancelle") conveyors, for example, conveyors which leave circulation surfaces free at the level of workstations. Products are placed in containers in quantity and according to a volume required by the distribution hoppers of the machines and it is necessary to raise the said containers from the slings to deposit them on the prefeed surface towards the hopper of the machine and, also, to raise the said containers, after they have been emptied, from the removal surface of the machine to place them on the slings returning to the general filling station. This occurs particularly in the case of feeding machines for packaging cigarettes for which the cigarettes are brought in containers called "boats" feeding the distribution hoppers.

The slings can co-operate in a reverse manner with the fabricating machines which must be periodically relieved of the fabricated products; in this case, the slings bring empty bins and take away full bins.

In the following description, the transfer containers are called bins.

According to the present invention there is provided a device for transferring articles to or from conveyors, which has a movable member arranged to seize said articles resting on one conveyor and to deposit them on another, comprising a framework serving as guide member, at least one carriage movable in translation on said framework and at least two pairs of transfer arms mounted in fixed vertical plane on said carriage.

The device may be arranged to transfer one or several bins of products from one conveyor to another conveyor, located in different planes without connection between them, for example, a transfer between two different substantially horizontal planes. One or more bins of products may be held laterally during the transfer.

Means may be provided for separating, during the transfer, the bins one from the other by a particular separation or inversely to bring together one with the other;

Means may be provided for controlling the aforesaid movements at times and according to necessary conditions for transfer;

There may be provided means for effecting, in inverse direction, the displacement of one member for the transfer of empty bins and one member for the transfer of full bins, said displacements being carried out, according to the location of the conveyors, by two separate transfer members, by two twin transfer members or moreover by a single member effecting the two transfers.

The means for transferring one or several bins from one conveyor to another conveyor located in different substantially horizontal planes, without connection between them, may consist essentially of one transfer member, movable between the two conveyors, seizing the bins resting on one of them, and proceeding to deposit them on the other, which may be constituted by a framework, serving as a rail for a movable arm-carrying carriage, fixed according to an adjustable angle, which takes the bins resting on one of the conveyors and deposits them on the second conveyor.

The angle formed by the arm and the framework may be adjusted in the course of operation by the action of a jack or by the structure of the framework which may comprise a curve on the course of the carriage.

The framework may be constituted by two parallel tubes along which the carriage moves, provided with arms, constituted by a cross-member with a wheel-train at each end.

Each wheel-train may be constituted by at least two rollers in opposition, located on each side of the rail, the line of their axis being oblique with respect to the axis of the rail.

The conveyors may be constituted by two arms spaced one from the other so as to enable movable transfer arms to pass between them, when they are not loaded.

The transfer means between two different substantially horizontal planes consist of adjusting the movement of the conveyor of the upper plane in such manner that this conveyor is not on the path of the movable transfer arms at the moment when the latter, loaded with bins, releases its enclosed volume, either in their ascending movement with a view to depositing it, or in its descending movement after seizing it, or inversely according to the direction of operations.

The means of transferring from one conveyor to another conveyor located in a different plane from that of the first, with no connection between them, one or more bins held laterally during the transfer may consist in a transfer member, movable between the two conveyors, seizing the bins held by one of them and proceeding to deposit them on the other, which may be constituted by a movable carriage provided with two parallel arms capable of enclosing laterally between them the bin or group of bins.

The two parallel arms may be fixed, one with respect to the other, and arranged in such manner that their separation is reduced, in one particular position, as a result of their axial rotation in a contrary direction one from the other, along the length of the bins to be seized.

The elements reducing their separation may be rods, fixed along the length of the arm, provided with closure pads.

The closure pads may substantially cover the sides of the bins.

The closure pads may comprise adhering means on the walls of the bins.

The adherence may be obtained by suction caps.

The adherence may be obtained by magnetic pads.

The closure pads may be coated with flexible material.

The closure pads may penetrate into projections provided on the sides of the bins. The closure pads may be applied over projections provided on the sides of the bins.

The means for separating or closing together the bins by a predetermined separation during their transfer may consist of closure elements capable of sliding on the shaft of the transfer arms and of separation between them by given amounts by means of slides or sleeves of which the plays between them are adjustable by apertures, the said element being rigidly attached to the shaft, in axial rotation, by a keying means or by non-circular form of the section of the shaft.

The means for controlling the displacements of the carriage may be constituted by a brake reduction motor ensuring by any transmission means, after an impulse released following a certain position and the loading of one of the conveyors, and with servo-relay means, the displacements and successive stops of the carriage in synchronism with the displacements of the conveyors.

A particular function of the lower conveyor may cause the displacement of the upper conveyor which delivers an impulse to control the displacements of the carriage.

The means for controlling the opening and closing of the holders may be obtained by a jack driving in axial-rotary motion the shaft of the transfer arms and, consequently, the closure elements, the jack being controllable by contacts arranged to correspond to certain positions of the carriage.

The movements in extension of the closure elements may be obtained, either by a jack which pushes the closure elements to make them slide on the shaft, the play between them being achieved by abutments in the gaps, or by a rack and pinion system, or even by the displacement of a roller in a guiding ramp with double effect during the displacement of the transfer arms carriage.

The means for displacing in reverse direction, between conveyors describing parallel planes without connections between them, a transfer member for full bins and a transfer member for empty bins, may consist in a single carriage, supporting the said members, controlled in a manner to effect in the course of one circuit of the framework, with stops at the desired points obtained by contacts and suitable servo-sytem, the transfer in one direction of empty bins during one part of the displacement and the transfer in reverse direction of full bins in the other part of the displacement.

The transfer member for full bins and the transfer member for empty bins may be the same member.

In order that the invention may be more fully understood, one embodiment thereof is described below purely by way of non-limiting example, with the aid of the accompanying drawings. The example consists of a device for the transfer of boats between a sling conveyor and a machine for packaging cigarettes, and it is illustrated in the drawings wherein:

FIGURES 4 and 5 shows a sling;

FIGURE 6 shows the arrangement of a train of wheels of the carriage;

FIGURES 11 and 12 shows the transfer arm in withdrawn and extended positions;

FIGURES 13 and 14 shows the rotation control for the closure elements.

Figure 1:
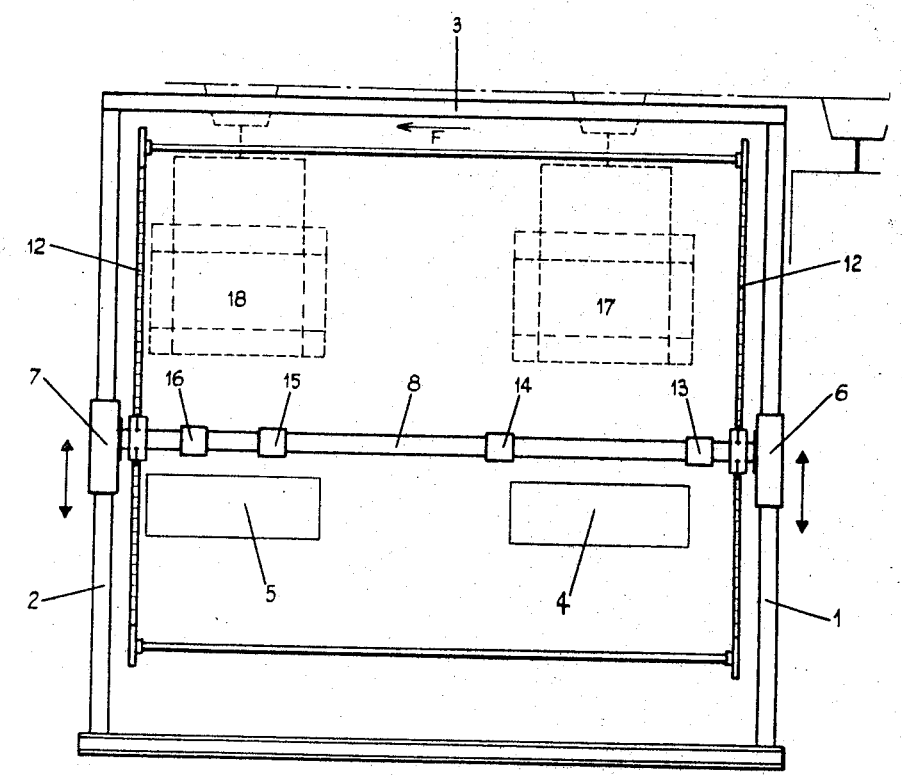
FIGURE 1 shows a schematic view of the placing of the framework with respect to the machine and to the slings.

Referring to the drawings, in FIGURE 1 it will be seen that the device comprises a framework formed by two substantially vertical uprights 1–2, connected by a cross-support 3, supported on each side of the machine and inclined towards it (see FIGS. 3 and 2) in proximity to the pre-feed stations 4 for full boats and removal 5 of empty bins. Between and along these two uprights, circulates a carriage 8 constituted by a shaft connecting two wheel trains 6–7 formed of sleeves provided with rollers 9–10 (FIG. 6), placed diagonally on both sides of each of the uprights to resist the effect of the inclination of the framework, and a supplementary roller 11 ensuring tightness. The carriage 8 is driven by two endless chains 12 parallel to the framework, controlled in alternating movement at the end of the course by a member (not shown) and being displaceable in several steps with the aid of servo-relays.

On the shaft on the carriage, are fixed four transfer arms mounted according to adjustable angles in a vertical plane around the shaft 8, in parallel pairs and placed in a manner such that the two arms 13 and 14 intended for the feeding opeartion are separated between them by a length slightly greater than the length of the bins and at equal distance, externally, on both sides of the lateral walls of the bins on the feeding surface; the two arms 15 and 16 intended for the removal of empty bins are on the other hand close together and at an equal distance internally on each side of the walls of the bins on the removal surface.

The sling 17, loaded with full bins, is at rest during the first operation, in an upper plane with respect to the machine, following the arrow F, to occupy the position 18, and at a speed suitable to bring it at the desired moment to rest in the operational position for the second operation. FIGS. 4 and 5 show that the slings are constituted by rods, in such a way that it is possible for the transfer arms 15 and 16 to traverse their interior; the bins 19 are thus only supported by the rods, correctly centred by two corners.

The transfer arms 15 and 16 intended for the removal of empty boats are bent at 90° at their free ends in order to form a holder which supports the bins taken by their bases while the tarnsfer arms 13 and 14 are specially constituted to take the bins laterally.

A special arrangement 21 on the machine enables the empty bins which must be removed, to be moved aside from the following empty bins, to enable the passage from the back of the arms 15–16 and facilitate the take up.

The arms 13 and 14 are each formed of five elements; those of the ends are fixed, one, 30, on the carriage, the other, 29, on the shaft of the arm by the pin 31, and the three others, 20, are slidably mounted on the shafts so as to separate or come together under the action of a braked reduction motor or any other means, represented by the arrow 25, the separations being adjusted by sleeves 26 acting in two directions between abutments 27 in appropriate gaps 28.

Figure 9:
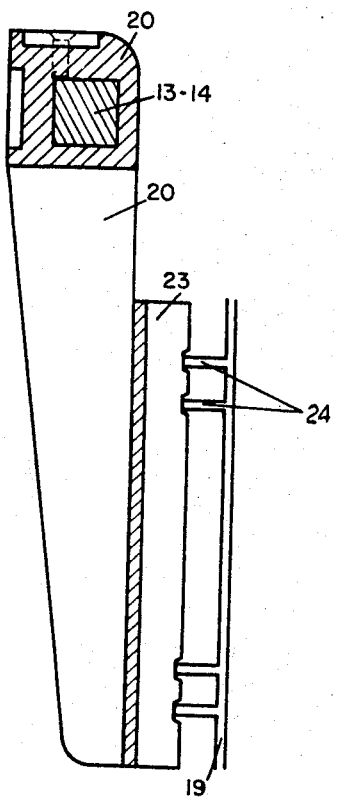
FIGURES 9 and 10 shows a closure element closed and open on the lateral side of a bin.
Figure 10:
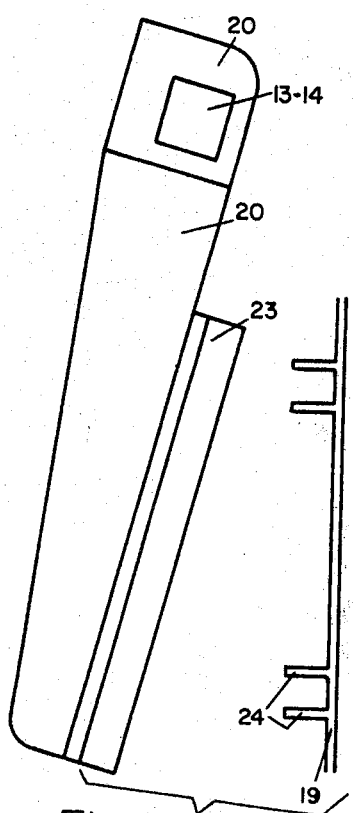

The elements 20 and 29 and 30 are rigidly fixed in rotation with the shafts, of non-circular section, transfer arms 13 and 14 and their movements, controlled by a jack 22, apply pads 23 of flexible material fixed on the elements 20 and 29 (FIGS. 9 and 10) against projections 24 provided in the lateral walls of bins 19 to close the latter for their transport, or move aside these pads to deliver the bins on the pre-feed area.

The operation of the device is effected as follows:

At the desired moment for the member (not shown) which ensures, starting from station 4 of the machine, the transfer of a full boat towards the feed hopper of the machine so that it cannot impede the operation of transfer arms 13 and 14 of the device, an impulse is given and starts the sling loaded with full boats to the place provided, at 17, perpendicular to the feed station 4, where it stops; the latter transmits an order to the carriage 8 which starts to rise.

Figure 2:
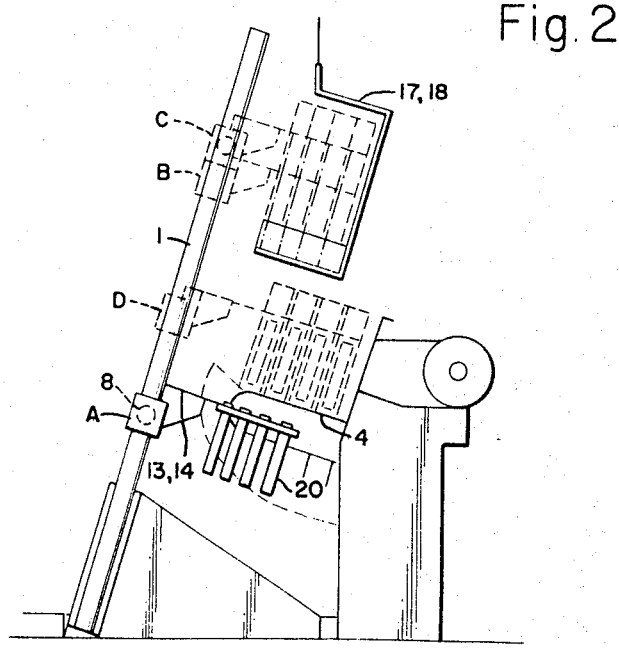
FIGURE 2 shows a view of the machine on the feeding side, with the transfer member.
Figure 3:
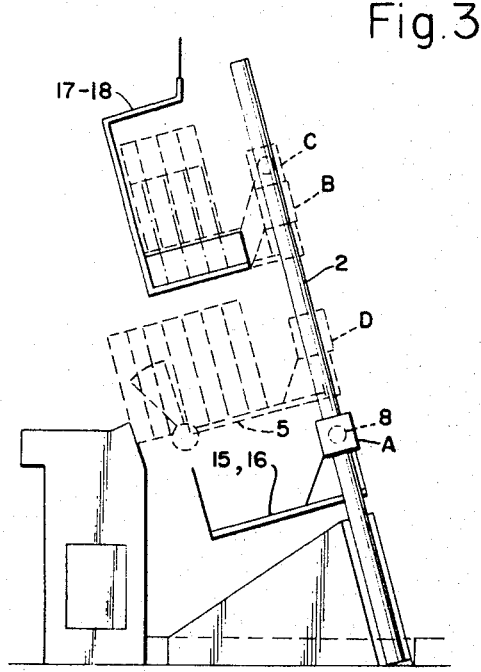
FIGURE 3 shows a view of the machine on the empty bin removal side, with the transfer member.
Figure 7:
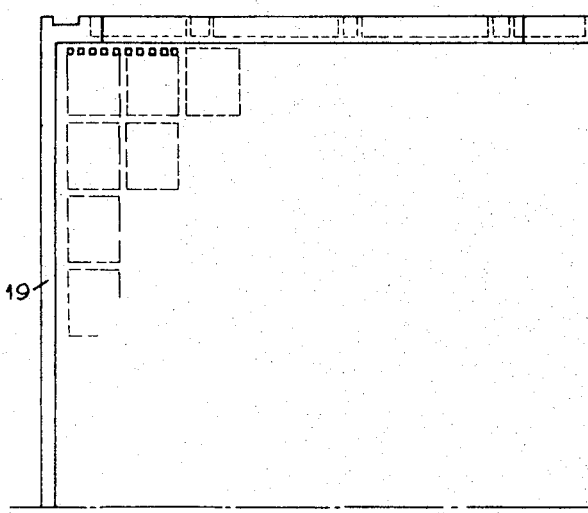
FIGURES 7 and 8 shows the form of a bin.
Figure 8:
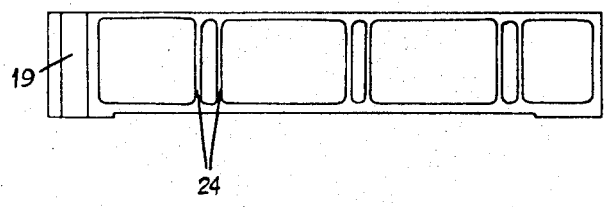

The transfer arms 13–14 which were in the low position 6–8A and 7–8A are actuated and effect the operations according to the following cycle (see FIGS. 2 and 3).

The pre-feed transfer arms 13–14, which remained with open pick-ups, rise empty to the loaded sling 6–8B; the closure elements are correctly positioned facing the lateral sides of the bins which are stowed one against the other on the sling, the angles of the arms being adjusted so that they are perpendicular to the large side of the bins. On command from a relay, the closure jack 22 turns the shafts of the arms and the closure elements 20–29 apply pads 23 against the projections 24 of the bins 19 and hold them firmly; then the carriage 8 resumes its ascending movement, stops at 6–8C and the released sling resumes its course to the position 18 where it stops. The carriage redescends until the arms arrive at the pre-feed area 6–8D on which they deposit the full bins which, during the descent, have been separated one from the other by the separation of the closure elements 20–29 at the necessary distance for their good positioning between the guide bars of the pre-feed 4; the closure elements open, the arms withdraw and the carriage resumes its course towards 6–8A, the transfer arms remaining open until the following cycle.

The removal arms, driven at the same time as the carriage, have in leaving the low position 7–8A, collected the bins which were at 7–8D on the removal surface slightly separated from those following by a catch 31 and they are taken off; the empty sling which has to receive the bins, has not arrived at its position and when the carriage after a stop at 7–8B due to the time necessary at 6–8B resumes its course towards 7–8C, the fork moves the bin to the upper level. When the sling is stopped at position 18, the carriage starts to descend, and the transfer arms, passing across the arms of the sling, deposit the bins there; after a stop at station 7–8D, necessitated by the stop at 6–8D, they pass across the removal area free of bins, and return to 7–8A to await the following cycle. In summary, transfer arms 13, 14 and 15, 16 which are mounted on the carriage 8, are drawn in solid lines in the starting position A. The operational movement is illustrated by showing the transfer arms in various positions in dotted lines. When the loaded tray (called "sling") on the suspended rail conveyor which moves in the direction of the arrow F, arrives at position 17 (FIG. 1), carriage 8 moves upwardly, bringing transfer arms 13, 14 to position B. In this position the closure elements 20 are swung in from both sides at the bins 19 and clamp the latter between them. Thereupon carriage 8 resumes its upward movement to position C, the tray which is now unloaded, is moved by the suspended rail conveyor to position 18 in the direction of the arrow F. Carriage 8 descends and stops at D. The mechanisms which is illustrated in FIGS. 11 and 12, spreads the clamping closure elements 20 along the transfer arms 13, 14 for separating the bins 19 from one another for properly depositing them between the guide bars of the feeder line 4; then the closure elements 20 are swung open and the bins are deposited on feeder 4. After that, carriage 8 continues its descent to the starting position A, closing the operating cycle.

Simultaneously the transfer arms 15, 16 which are also mounted on the carriage 8, had lifted the empty bins from the removal station 5 upwardly to the same position B where the empty tray has not yet arrived, and keeps lifting the bins to position C, so that the tray may slip beneath the arms 15, 16 into the station marked 18 in FIG. 1. When now, the carriage 8 descends with the full bins clamped between the closure elements 20 on the transfer arms 13, 14, the transfer arms 15, 16 will deposit at the same time the empty bins on the tray at 18 and will return empty to the starting position A after a short stop at position D where they pass across the empty removal station 5.

Figure 15:
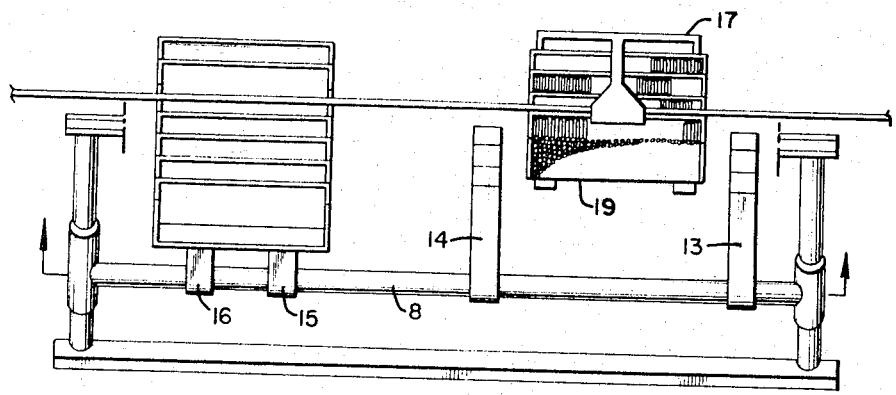
FIGURES 15 to 20 are top plan views which show the arrangement of the present invention in different positions within its cycle of motion.
Figure 16:
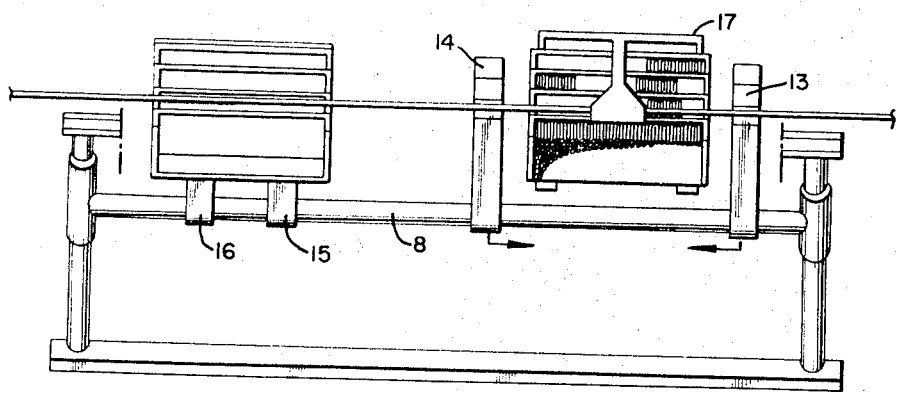
Figure 17:
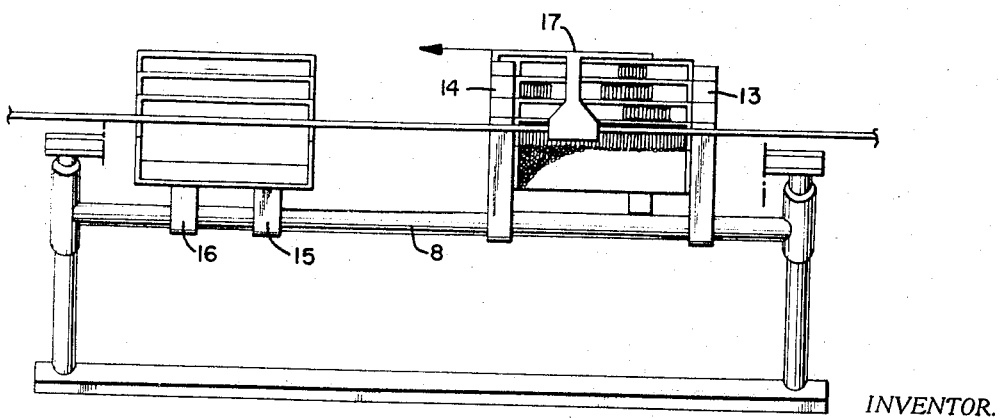
Figure 18:
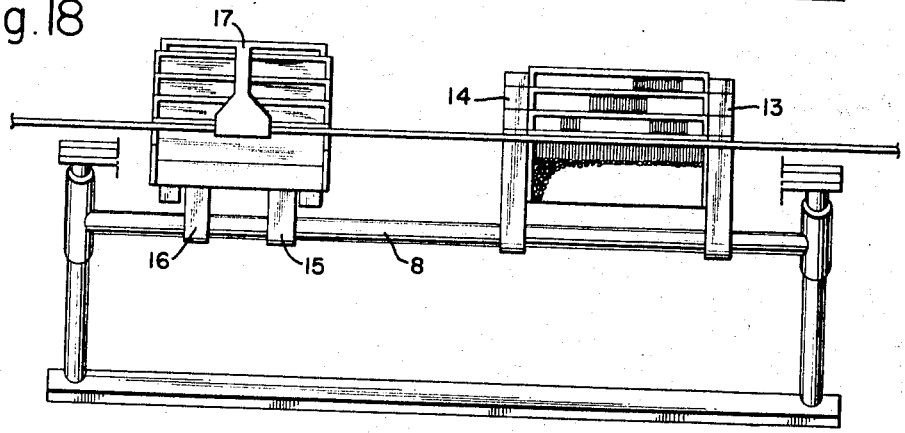
Figure 19:
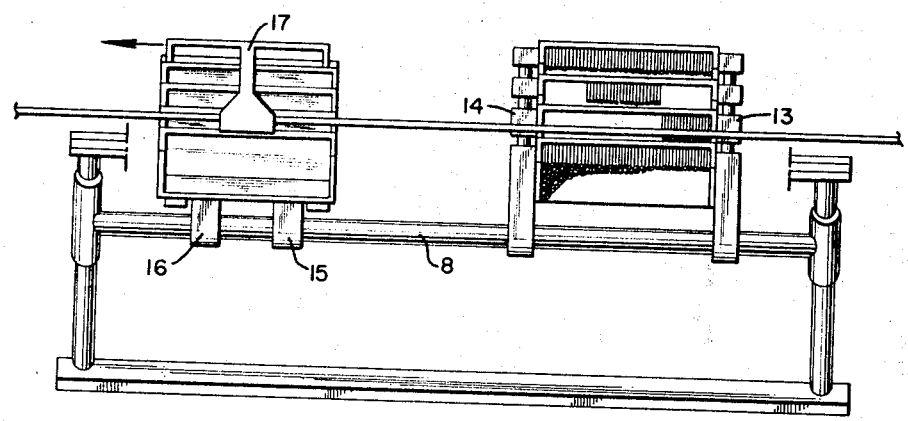
Figure 20:
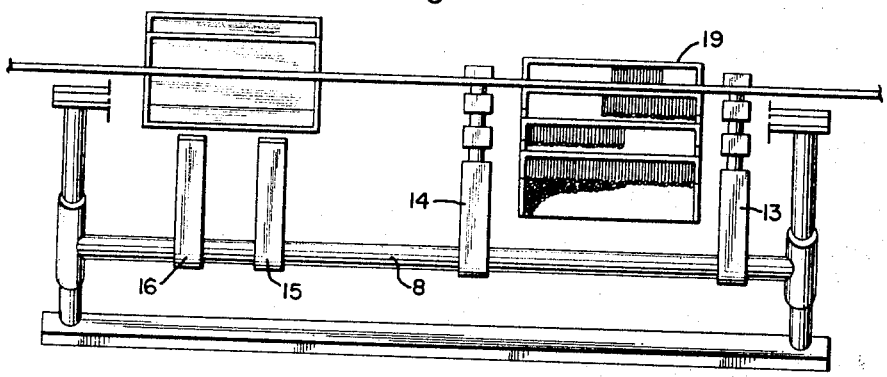

Referring to FIGS. 15 to 20, in FIG. 15, the carriage 8 is in position A, the loaded tray 17 arrives at position 17 on the upper conveying path; four empty bins (out of six) on station 5 of the lower conveying path are taken by the transfer arms 15–16; in FIG. 16, the carriage 8 is in position B, the arms 13, 14 are brought together to clamp the loaded bin 19 between them; in FIG. 17, the carriage 8 is in position C, the loaded bins 19 are clamped between arms 13, 14 and the empty tray 17 moves towards position 18; the empty bins taken by arms 15, 16 are now in position 18 on the upper conveying path; in FIG. 18, the empty tray is in position 18 on the upper conveying path and the four empty bins are deposited on the empty tray; in FIG. 19, the carriage 8 is in position B, the tray takes away the four empty bins and along the arms 13, 14 the closure elements are spread for separating the loaded bins 19 from one another; in FIG. 20, the carriage 8 is back to position A and the loaded bins 19 are down to the lower conveying path separated from one another.

As clearly seen in FIGS. 15 to 20, the bins are transferred by the same device from position 17 on the upper conveying path to position 4 on the lower conveying path and from position 5 on said lower path to position 18 on said upper path.

What I claim is:

1. A device for transferring articles from a first conveying path, to a second conveying path and inversely, comprising carrying means movable in translation from said first conveying path to said second conveying path, means for guiding said carrying means in its translation movement, a first pair of transfer arms mounted on said carrying means and adapted to transfer said articles from a first position on said first conveying path to a first position on said second conveying path, and a second pair of transfer arms mounted on said carrying means and adapted to transfer said articles from a second position on said second conveying path to a second position on said first conveying path, said first pair of transfer arms comprising at least two pairs of oppositely faced lateral gripping members for the articles to be transferred, said pairs of lateral gripping members being slidably mounted on said arms and means are provided to space one pair relatively to the other.

2. A device for transferring articles from a first conveying path, to a second conveying path and inversely, comprising carrying means movable in translation from said first conveying path to said second conveying path, means for guiding said carrying means in its translation movement, a first pair of transfer arms mounted on said carrying means and adapted to transfer said articles from a first position on said first conveying path to a first position on said second conveying path, and a second pair of transfer arms mounted on said carrying means and adapted to transfer said articles from a second position on said second conveying path to a second position on said first conveying path, said carrying means comprising a single carriage and said guiding means comprising a single framework, said articles being conveyed from said first position on said first conveying path to said second position on said first path by means of separate conveyors moving one behind the other on said path, control means are provided to move said carriage in synchronism with said conveyors whereby during the movement of said carriage from said first path to said second path, said first pair of transfer arms unloads articles from a conveyor located at said first position on said first path and during the return movement of said carriage from said second path to said first path, said second pair of transfer arms loads articles on a conveyor located at said second position on said first path, said conveyors comprising two parallel arms adapted to support said articles and said arms of said second pair of transfer arms are parallel to said arms of said conveyors and spaced by a distance less than the distance from which are spaced said arms of said conveyors whereby enabling said second transfer arms to pass between said conveyor arms when said conveyor is not loaded with articles.

3. A device for transferring full bins from a first station on a first conveying path to a first station on a second conveying path and in the same cycle of operation transferring empty bins from a second station on said second path to a second station on said first path, comprising carrying means movable between said first and second conveying paths, means for guiding said carrying means in its movement, a first pair of transfer arms mounted on said carrying means adjacent said first stations, and a second pair of transfer arms mounted on said carrying means adjacent said second stations, said first and second pair of transfer arms moving simultaneously from the first conveying path to the second conveying path, means on said first pair of transfer arms to grip and carry full bins from said first station on the first conveying path to said first station on said second path during one portion of the cycle of operation and means on said second pair of transfer arms to carry empty bins from said second station on said second conveying path to the second station on said first conveying path during another portion of the cycle.

4. A device as in claim 3, wherein said carrying means comprise a single carriage and said guiding means comprise a single framework.

References Cited

UNITED STATES PATENTS

| | | | |
|---|---|---|---|
| 2,999,604 | 9/1961 | Chalich | 214—1 |
| 3,075,651 | 1/1963 | Kaden | 214—1 |
| 3,076,561 | 2/1963 | Rogers | 214—1 |

GERALD M. FORLENZA, *Primary Examiner.*

GEORGE F. ABRAHAM, *Assistant Examiner.*

U.S. Cl. X.R.

214—1